United States Patent [19]

Tsuboi

[11] Patent Number: 4,827,303
[45] Date of Patent: May 2, 1989

[54] DISTANCE MEASURING DEVICE

[75] Inventor: Takayuki Tsuboi, Kanagawa, Japan

[73] Assignee: Canon Kabushiki Kaisha

[21] Appl. No.: 153,476

[22] Filed: Feb. 2, 1988

Related U.S. Application Data

[63] Continuation of Ser. No. 861,613, May 5, 1986, abandoned, which is a continuation of Ser. No. 577,089, Feb. 6, 1984, abandoned.

[30] Foreign Application Priority Data

| Feb. 8, 1983 | [JP] | Japan | 58-18054 |
| Feb. 8, 1983 | [JP] | Japan | 58-18055 |
| Feb. 8, 1983 | [JP] | Japan | 58-18056 |
| Feb. 8, 1983 | [JP] | Japan | 58-18057 |
| Feb. 9, 1983 | [JP] | Japan | 58-18760 |

[51] Int. Cl.$^4$ .............................. G03B 3/10
[52] U.S. Cl. .................. 354/403; 354/409; 250/578
[58] Field of Search .......... 354/162, 400–409, 354/429, 430, 432; 250/578, 234, 235, 201

[56] References Cited

U.S. PATENT DOCUMENTS

| 4,227,790 | 10/1980 | Shenk | 354/400 |
| 4,341,451 | 7/1982 | Kroeger et al. | 354/474 |
| 4,400,071 | 8/1983 | Tamura et al. | 354/409 |
| 4,470,681 | 9/1984 | Johnson | 354/403 |
| 4,534,636 | 8/1985 | Sugawara | 354/403 |

*Primary Examiner*—L. T. Hix
*Assistant Examiner*—David M. Gray
*Attorney, Agent, or Firm*—Toren, McGeady & Associates

[57] ABSTRACT

In a distance measuring device for automatically detecting an object distance on the basis of triangulation by unidirectional optical scanning of a distance between the closest distance and infinity, a plurality of distance measuring points are set within an object range and are spread perpendicular to the distance measuring direction; and these distance measuring points are optically scanned concurrently with the above scanning operation.

7 Claims, 11 Drawing Sheets

FIG.11

| DISTANCE ADDRESS NO. / DISTANCE MEASUREING POINTS | P1 | P2 | P3 | P4 | P5 | P6 | P7 | P8 | P9 | APERTURE VALUE INFORMATION | COMPUTATION |
|---|---|---|---|---|---|---|---|---|---|---|---|
| 1 | | | | | | | | | | | IN CASE OF DISTANCE ADDRESS 4: |
| 2 | | | | | | | | | | | |
| 3 | | | | | | | | | | MORE THAN F2.8 → 0 | 4+0=4 |
| 4 | | | PEAK | | | | | | | F2.8 → 1 | 4+1=5 |
| 5 | | | | | | PEAK | | | | F4 → 2 | 4+2=6 |
| 6 | | | | | | | | | | F5.6 → 3 | 4+3=7 |
| 7 | | | | | PEAK | | | | | F8 → 4 | 4+4=8 |
| 8 | | | | | | | | PEAK | | F11 → 5 | 4+5=9 |
| 9 | | | | | | | PEAK | | PEAK | F16 → 6 | 4+6=10 |
| 10 | PEAK | PEAK | PEAK | | | | | | | F22 → 7 | 4+7=11 |
| 11 | | | | | | | | | | F32 → 8 | 4+8=12 |
| 12 | | | | | | | | | | | |
| 13 | | | | | | | | | | | |
| 14 | | | | | | | | | | | |
| 15 | | | | | | | | | | | |

NEAR DISTANCE SIDE

LONG DISTANCE SIDE

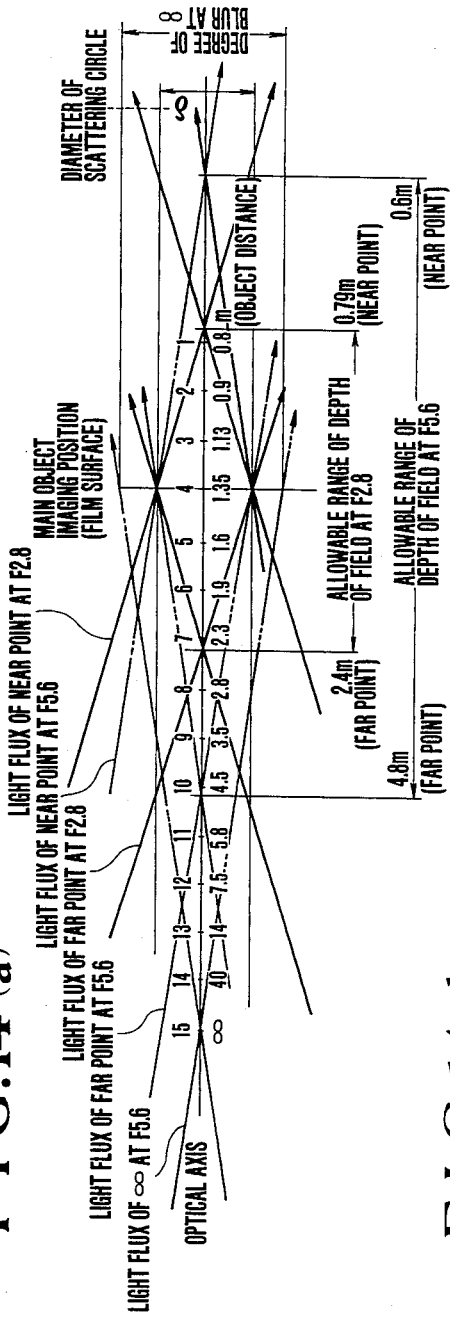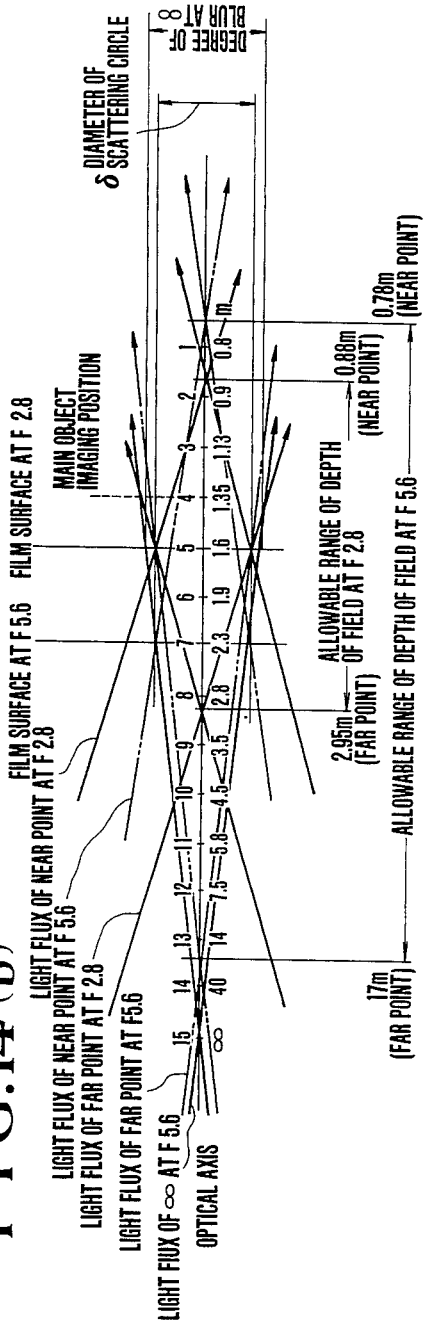
F I G. 14 (a)
F I G. 14 (b)

DISTANCE MEASURING DEVICE

This is a continuation of application Ser. No. 861,613 filed May 5, 1986, which in turn is a continuation application of Ser. No. 577,089, filed Feb. 6, 1984.

BACKGROUND OF THE INVENTION

1. Field of the Invention

This invention relates to an improvement on a distance measuring device based on triangulation and more particularly to an improved distance measuring device which is highly suitable for use in an automatic focusing camera, etc.

2. Description of the Prior Art

Heretofore various kinds of automatic distance detecting methods have been used for automatic focusing cameras. All of these cameras are provided with a distance measuring mark around the middle of a photography picture plane. The main object to be photographed is placed within the distance measuring mark for the purpose of focusing the camera on the main object. However, when the main object is not in the middle of the picture plane, it is always out of focus. A camera of this type is very inconvenient.

Another camera has a pre-focus mechanism wherein, in order for the photographer to have some latitude in composing the picture to be taken, the distance measuring action and exposure action of the camera, which are normally carried out simultaneously, are carried out separately. This type of camera permits photography picture composition with the main object not necessarily located in the middle of the picture. The camera with such a pre-focus mechanism, however, has the following problem:

In a picture composition, as shown in FIG. 1 of the accompanying drawings (having two persons standing with a monument located far behind between them and with an archway of a Shinto shrine farther behind), for example, the photographer, if he is not well versed in cameras, tends to adjust a distance measuring mark A to the monument between the two persons. Then, contrary to the photographer's expectation, the persons are out of focus although the monument is in focus. This kind of failure is a frequent occurrence with such cameras. Thus, conventional automatic focusing cameras have not completely relieved the photographer from focusing operations and have necessitated bringing the main object to the distance measuring mark A.

Furthermore, the ordinary photography composition generally includes a main object such as a person on which the camera should be focused first and an auxiliary object such as a background. Photography with conventional automatic focusing cameras for such picture composition often has the auxiliary object out of focus while only the main object is in focus. There are occasions on which commemorative photography is desired with importance also attached to the background, which is an auxiliary object. On such occasions, the photographer naturally desires to focus the camera on the background as well as on the people who are the main object. However, such a desire has been difficult to satisfy with conventional automatic focusing type camera.

To solve this problem, there has been proposed, in Japanese Laid-Open Patent Application No. SHO 56-101128, a camera with a pre-focus mechanism wherein distance measuring operations are performed, one by one, on a plurality of photography objects. A plurality of data thus gathered is memorized, and then the camera is focused on a point that comprehensively includes all of these objects in an in-focus condition. In accordance with this proposal, the memorized distance information on multiple objects is obtained by computation. The photo-taking lens is adjusted to a focusing position at which all the objects come within the field depth determined by the aperture of the photo-taking lens. Furthermore, in the event that all the object distance information values do not come within the field depth, only the objects that can be covered by the field depth are taken into consideration while the object distance information on the other objects that cannot be covered is cancelled, so that the distance on which the photo-taking lens is accurately focused can be determined.

However, a camera of this type presents another problem in that the photographer is required to repeatedly perform distance measuring operations to bring multiple objects into a distance measuring mark 1. This is not only troublesome but also consuming time. Furthermore, with a automatic focusing camera of this type, in order to have as many objects as possible within the field depth for photographing multiple objects located at different distances within the camera field, the focusing distance of the photo-taking camera is adjusted to a great distance. As a result, it is highly probable that an object which is located close up and which is often the main object to be photographed is blurred while only the background is in focus. This has been a serious problem for the photographer.

A first object of this invention is to provide a distance measuring device capable of simultaneously detecting, by one distance measuring operation, different distances at which a plurality of objects to be photographed are located, so that the above problem of the prior art devices can be solved.

A second object of the invention is to provide a camera having the above device arranged to preferentially permit focusing on the closest object among a plurality of objects subjected to distance measurement.

A third object of the invention is to provide a camera in which the above device is capable of performing a focusing operation, taking into consideration such auxiliary objects as background, etc. in addition to the main object.

A fourth object of the invention is to provide a camera wherein the above device, which is capable of performing a focusing operation while taking into consideration auxiliary objects in addition to a main object, prevents over-exposure of the main object in flash photography.

A fifth object of the invention is to provide a camera which is provided with the above device and which is capable of indicating on what part of the picture plane the photo-taking lens is focused.

The term "focusing distance" as used herein is intended to mean a distance at which the photo-taking lens is accurately focused, i.e. in focus.

These and further objects and features of the invention will become apparent from the detailed description of the preferred embodiments thereof taken in connection with the accompanying drawings.

SUMMARY OF THE INVENTION

To attain the first object, in accordance with this invention, a plurality of distance measuring points are set within an object range extending perpendicular to the distance direction. Then, the above plural distance measuring points are optically scanned concurrently with another optical scanning operation which is performed in one direction between the closest distance and infinity.

To attain the second object, in accordance with the invention, the camera is provided with lens position designating means which selects distance information on the closest object among multiple objects subjected to distance measurement by distance measuring means and designates a photo-taking lens position suited to the distance information.

To attain the third object, the camera according to the invention is provided with lens position designating means which designates a position of the photo-taking lens in such a manner that a distance measured object is located between a focusing distance of the photo-taking lens and the closest point of the field depth determined by the aperture of the photo-taking lens.

To attain the fourth object, in accordance with the invention, the camera is provided with lens position designating means which is arranged as follows: In performing normal photography, a photo-taking lens position is designated to have a distance measured object located between the focusing distance of the lens and the closest point of the field depth determined by the lens aperture. In flash photography, a photo-taking lens position has the distance at which a distance measured object is located coincide with the focusing distance of the photo-taking lens.

To attain the fifth object, the camera according to the invention comprises a plurality of point-by-point distance measuring units arranged within the distance measuring device to detect an object distance for every one of a plurality of distance measuring points set within the photography picture plane. A lens position designating means designates a lens position determined on the basis of information on a plurality of object distances coming from the point-by-point distance measuring units. A plurality of display elements are arranged within a view finder in positions corresponding to the above distance measuring points. Point-by-point in-focus determining means for determining an in-focus point among the above points with a photo-taking lens in the lens position is designated by the lens position designating means and controls the display operation of the display elements based on the result of the in-focus determination.

BRIEF DESCRIPTION OF THE DRAWINGS

FIG. 11 is a table showing the computing method in the same embodiment.

FIG. 14(a) is an illustration showing the field depth in the conventional camera.

FIG. 14(b) is an illustration of the field depth of a camera, according to the invention in an embodiment thereof.

DETAILED DESCRIPTION OF THE PREFERRED EMBODIMENT

Figure 2:
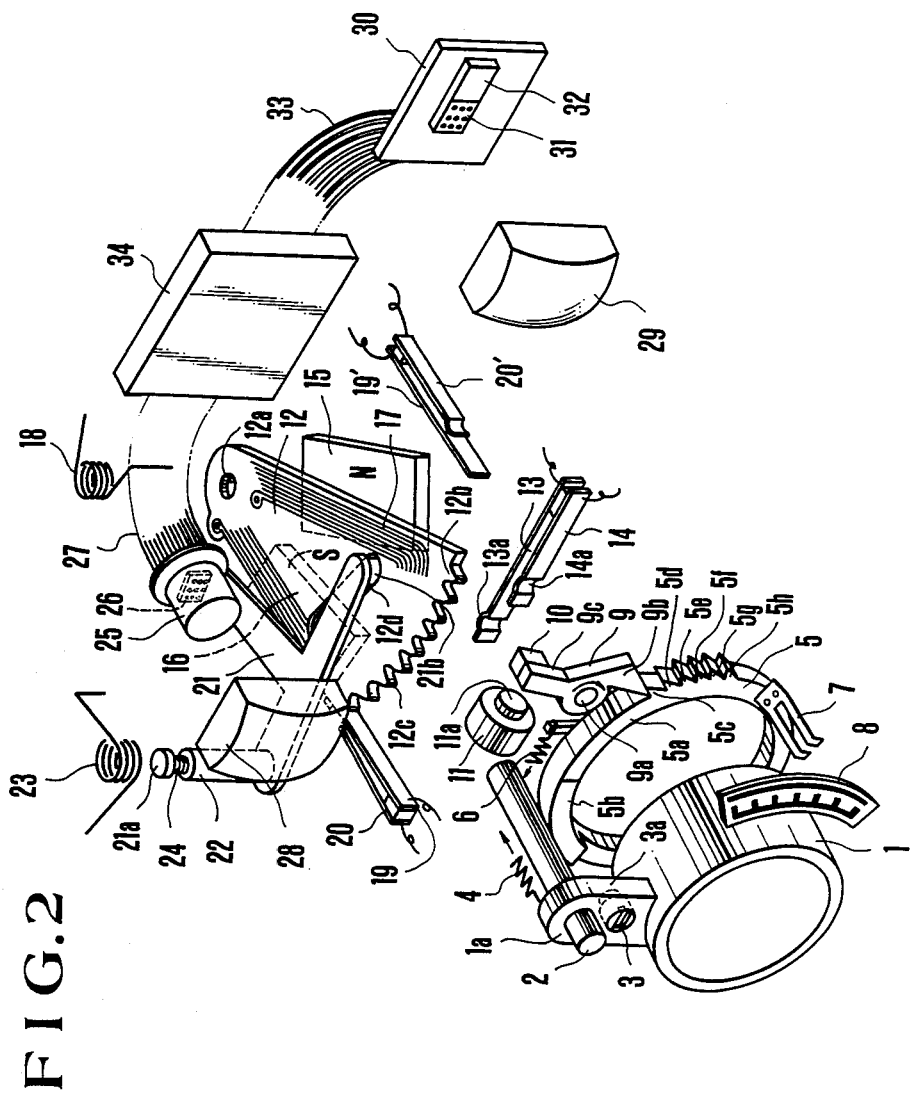
FIGS. 2, 3 and 4 are oblique views showing the structural arrangement of the automatic focus control mechanism of a camera in an embodiment of the present invention.
Figure 3:
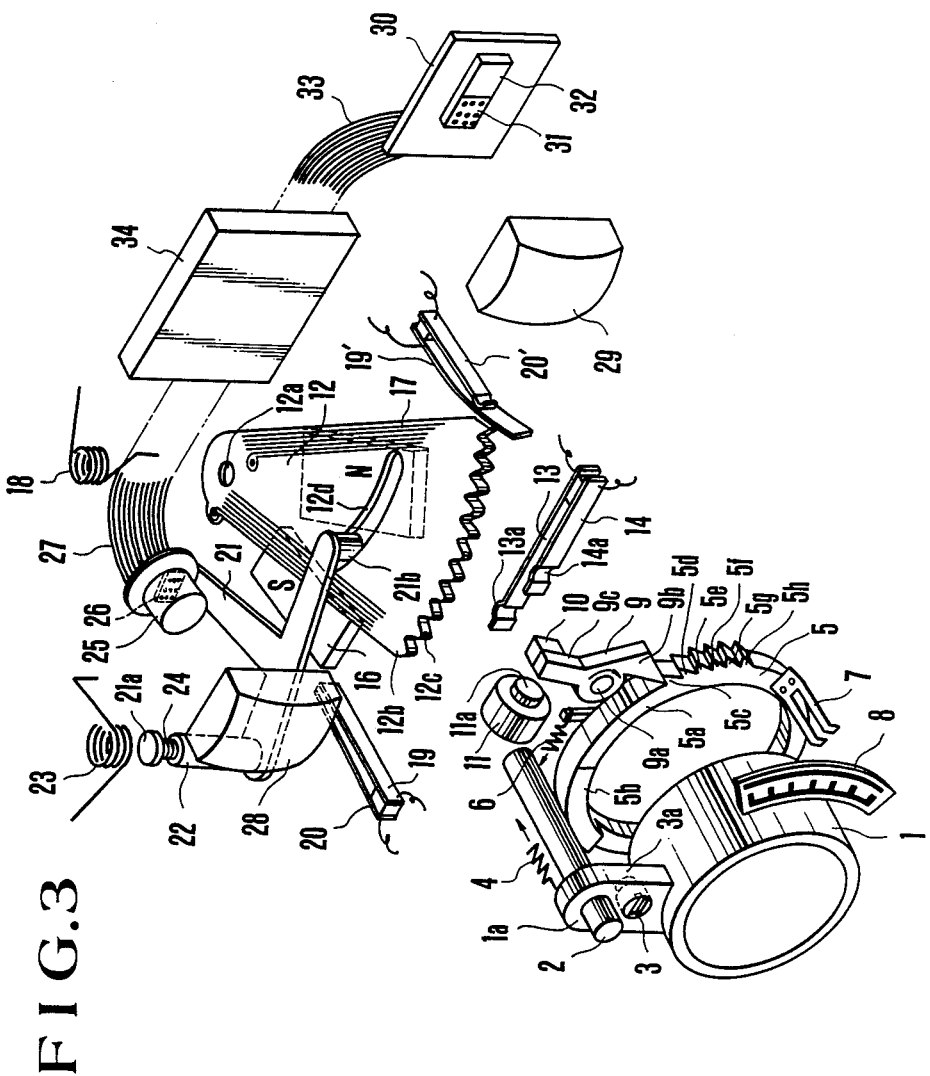
Figure 4:
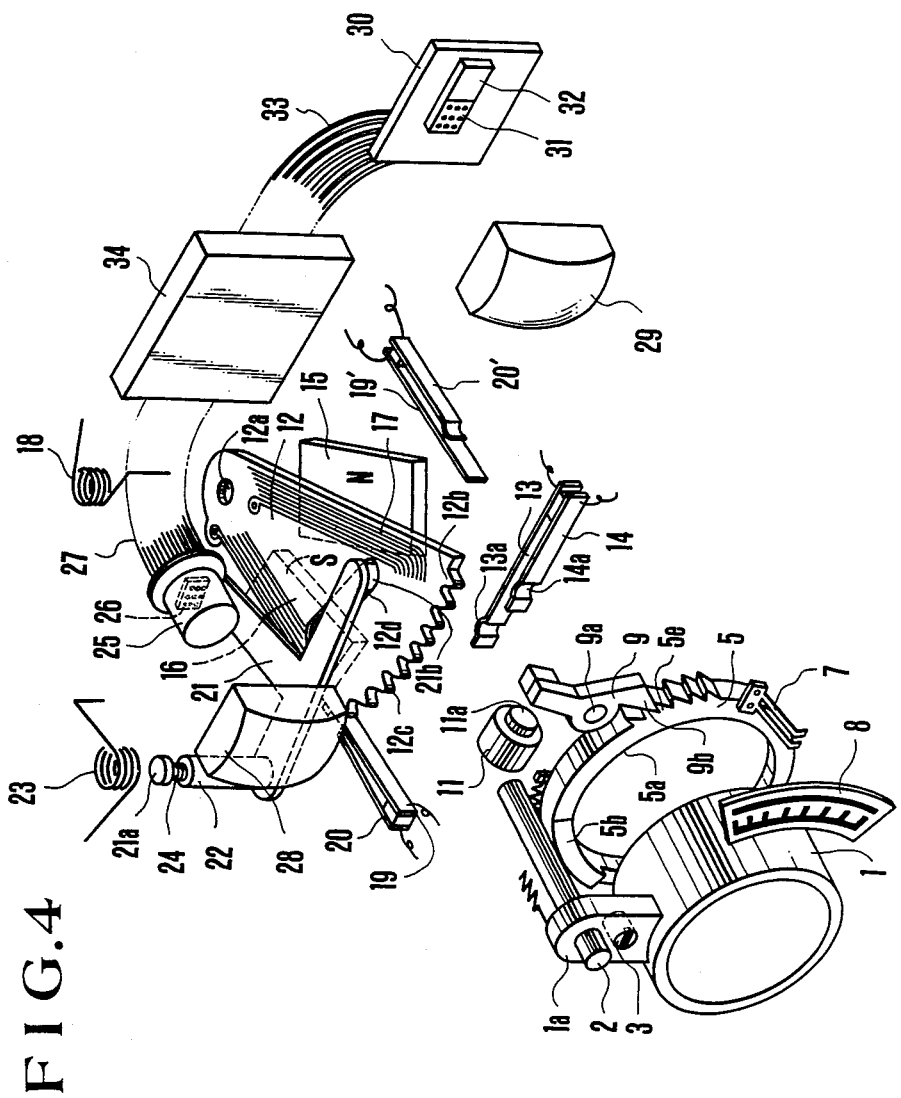

FIGS. 2-8 show an embodiment of the invention. FIGS. 2-4 are oblique views showing the structural arrangement of the automatic focus control mechanism of the embodiment. A lens barrel 1 contains therein a photo-taking lens (not shown) and is shiftable between the closest and the infinity distance end. The lens barrel 1 is provided with a projection 1a which is one unit with the former and is movable back and forth, being guided by an inserted bar 2. The inserted bar 2 is in fitting engagement with a structural member (not shown). A focusing screw 3 is screwed into the projection 1a and has its one end 3a abutting on a draw-out cam part 5b of a distance adjustment ring 5, which will be described later herein. The movable range of the photo-taking lens is adjustable by turning the focusing screw 3. A spring 4 constantly urges the lens barrel 1 to move in the direction of the arrow to keep the end 3a of the focusing screw 3 in abutting contact with the draw-out cam part 5b of the distance adjustment ring 5. The distance adjustment ring 5 is provided with an inner part 5a, the draw-out cam part 5b, a charged lock part 5c and lock parts 5d, 5e, 5f, 5g and 5h. In this embodiment, there are shown five lock parts 5d-5h. However, in an actual embodiment, the distance adjustment ring is provided with 15 lock parts, as shown in FIG. 11. The inner part 5a is fitted on a structural member (not shown) and is carried by the structural member. With the draw-out cam part 5b having the fore end 3a of the focusing screw 3 which is screwed into the projection 1a of the lens barrel 1 abutting thereon, the lens barrel 1 is drawn in or out based on how the distance adjustment ring 5 turns. The charged lock part 5c is locked to keep the distance adjustment ring 5 in a charged position by a claw part 9b of a stop pawl 9, which will be described later. The lock parts 5d-5h are in positions corresponding to different draw-in extents of the lens barrel 1. The inward drawing movement of the lens barrel 1 stops when the claw part 9b of the stop pawl 9 plunges into any one of the lock parts 5d-5h.

A spring 6 urges the distance adjustment ring 5 to turn counterclockwise (in the direction of the arrow). A contact piece 7 is provided for a lens shifting extent monitor signal and slides over a pulse plate 8 as the distance adjustment ring 5 turns. The stop pawl 9 is turnably carried by a structural member (not shown)

which is fittingly inserted into a hole 9a of the stop pawl 9. A spring (not shown) urges the stop pawl 9 to turn clockwise (in the direction of the arrow). Furthermore, the stop pawl 9 is provided with the claw part 9b and a projection 9c which carries an armature 10. A distance adjustment starting magnet 11 has the armature 10 attracted by a yoke 11a when the magnet 11 is excited. With the armature 10 thus attracted, the stop pawl 9 turns counterclockwise against the force of the spring. The charged lock part 5c of the distance adjustment ring 5 is disengaged from the claw part 9b of the stop pawl 9. Then, with the distance adjustment starting magnet 11 demagnetized, the claw part 9b again plunges into one of the lock parts 5d-5h. A sector rotor 12 also serves as a cam member and is pivotally carried at a hole part 12a by a structural member (not shown). The sector rotor 12 is provided with a cam part 12b, which is formed at the fore end of the rotor 12. A projection 13a of a count contact piece 13 abuts on the cam part 12b. When the projection 13a of the count contact piece 13 comes to a tip part 12c of the cam part 12b, the count contact piece 13 comes into contact with a projection 14a of another count contact piece 14. Then, an output is produced at a pulse generator which will be described later. The rotor 12 is provided with another cam face 12d which abuts a light projecting element holder pin 21b. This pin 21b is a unit with a light projecting element holder 21, which will be described later. The turning movement of the rotor 12 on the hole part 12a causes the light projecting element holder 21, which will be described later, to move along the cam face 12d. Below the rotor 12 are magnets 15 and 16 which are magnetized to have their N and S poles facing the rotor 12. Above the rotor 12 and below the magnets 15 and 16 are yokes for passing magnetic fluxes produced by the magnets 15 and 16. These parts constitute a stator 15, 16. A spiral rotor coil 17, which is partly shown in the drawing, is formed on the surface of the rotor 12 by a printed circuit. The rotor 12 and the stator which consists of the magnets 15 and 16, etc. form a photography object scanning motor for driving the light projecting element holder 21 into a charged position. With a current supplied to the spiral rotor coil 17, the rotor 12 turns counterclockwise by Fleming's rule, against the urging force of a spring 18 until it stops abutting on a structural member (not shown).

There are provided contact pieces 19 and 20 for a distance measurement completion signal. These contact pieces 19 and 20 are closed to form a signal when the rotor 12 reaches a position where a scanning operation is completed. The signal thus formed by these contact pieces 19 and 20 is produced at a distance measurement completion detecting part, which will be described later. Furthermore, there are provided another pair of contact pieces 19' and 20', which produce a start position confirmation signal. When the rotor 12 is in a position where it is completely charged, these contact pieces 19' and 20' are pushed and thus produce the start position confirming signal to a start position confirming circuit which will be described later. The light projecting element holder 21 has a shaft part 21a rotatably carried by a structural member 22. A spring 23 urges the holder 21 to turn clockwise. However, the holder 21 stops when the light projecting element holder pin 21b abuts the cam face 21d of the rotor 12. A compression spring 24 urges the shaft part 21a of the light projecting element holder 21 to move upward and thus prevents the light projecting element holder 21 from chattering.

A light projecting part 25 is one unit with the light projecting element holder 21 and is provided with a light projecting element part 26. The light projecting element part 26 is disposed within a light projecting part 25 and consists of nine light projecting elements. The embodiment further includes a connector part 27; a light projecting lens 28 which is disposed in front of the light projecting part 25 in the direction of an optical axis; a light receiving lens; a substrate 30 for light sensitive elements, the substrate 30 to carrying a light sensitive element part 31 consisting of nine light sensitive elements and a peak detection part 32 which will be described later; another connector part 33; and a substrate 33 which carries a start position confirmation circuit 34, a light projecting element control circuit 105, an aperture value determining circuit 112; a pulse counter part 108, a near distance determining circuit 110, a lens position computing circuit 114, a lens drawout control circuit 116, etc. which will be described later herein.

Figure 5:
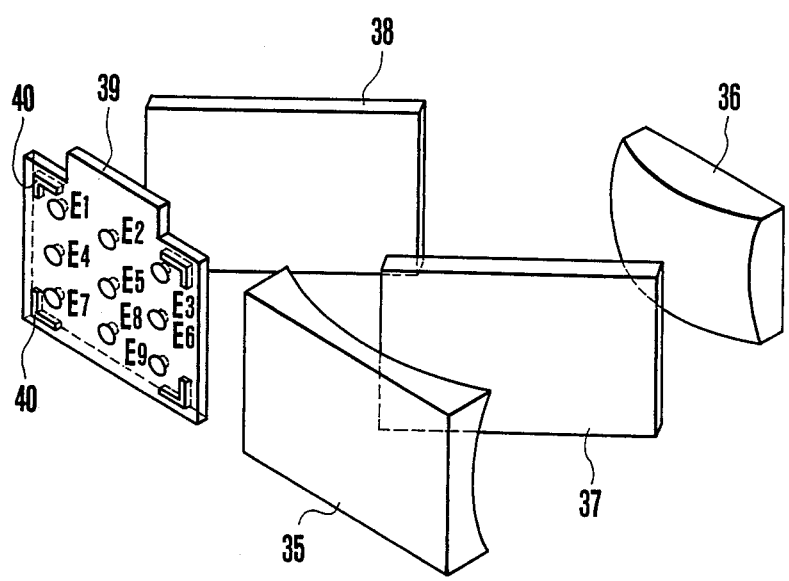
FIG. 5 is an oblique view showing the structural arrangement of the view finder in the same embodiment.

FIG. 5 is an oblique view showing the structural arrangement of the view finder part of the embodiment. The view finder part includes a view finder optical system consisting of an objective lens 35 and an eyepiece 36, which are carried by a structural member (not shown); a half mirror 37; a total reflection mirror 38; and a substrate 39 for display elements. A lighting type frame 40 is one unit with the display element substrate 39. Nine display elements E1-E9 are secured to the surface of the substrate 39. These display elements E1-E9 are completely shielded from external light by surrounding members (not shown) with the exception of a hole provided in the lighting type frame 40.

Figure 6:
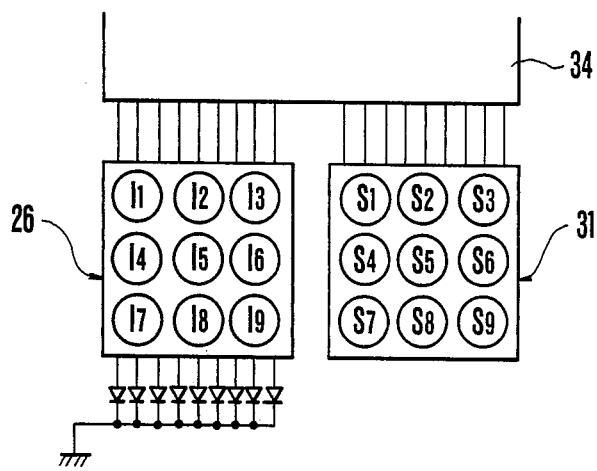
FIG. 6 is an illustration of the arrangement of the light projecting element and light sensitive element in the same embodiment.

FIG. 6 shows the light projecting part 26 and the light sensitive element part 31. Light projecting elements I1-I9 are arranged in three rows and three columns. Light sensitive elements S1-S9 are also respectively in positions corresponding to these light projecting elements I1-I9.

Figure 7A:
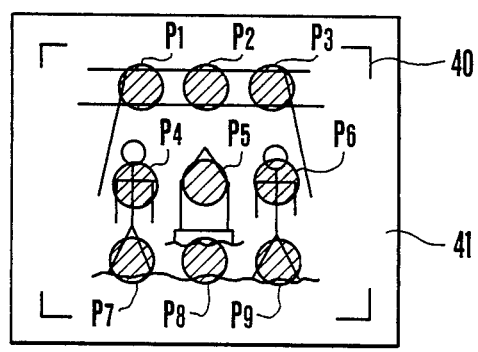
FIGS. 7(a) and 7(b) are illustrations of distance measuring points in the same embodiment.
Figure 7B:
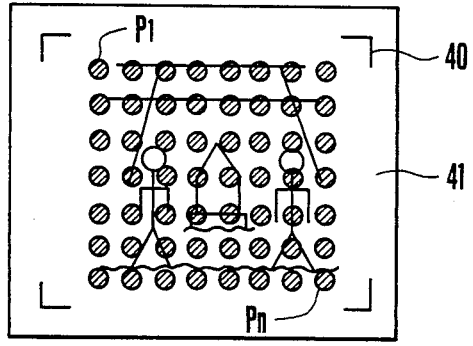

FIGS. 7(a) and 7(b) show the visual field of the view finder. In each of these drawings, reference numeral 41 identifies the visual field of the view finder. Distance measuring points P1-P9 are set in predetermined positions within the photography picture plane. Each of the light projecting elements I1-I9 projects light onto photography objects corresponding to one of the distance measuring points P1-P9. Then, reflected light fluxes coming from these objects are received by these light sensitive elements S1-S9. The positions of the distance measuring points P1-P9 within the visual field 41 of the view finder respectively correspond to the positions of the display elements E1-E9. In accordance with the invention, the number of distance measuring points P1-P9 is not limited to nine. As shown in FIG. 7(b), the distance measuring points P1-Pn may be arranged in a different number N. However, in that instance, the number of the light projecting elements I1-I9 and the number of light sensitive elements S1-S9 must also be the same number N.

Figure 8:
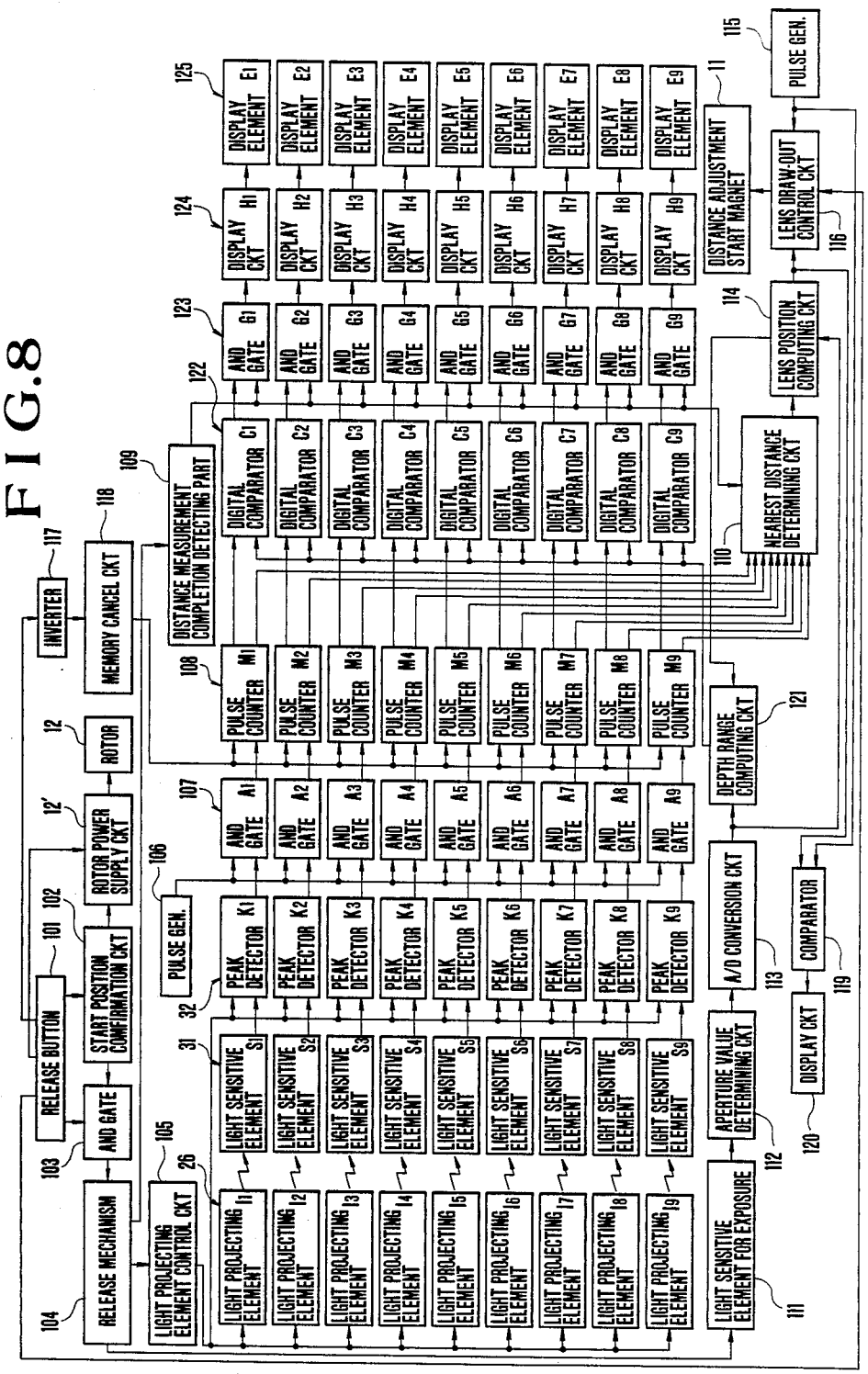
FIG. 8 is an electric circuit diagram of the automatic focus control mechanism in the same embodiment.

FIG. 8 is an electric circuit diagram of the automatic focus control mechanism according to the invention. A shutter release button 101 produces a high level signal when the photographer depresses the button 101 (a release operation). The automatic focus control mechanism includes a start position confirmation circuit 102, which is provided for confirmation of a condition that permits distance measurement commencement. This condition is confirmed when the contact pieces 19' and 20' for the start position confirmation signal turn on. Then, the position confirmation circuit 102 produces high level signals, which are respectively supplied to an AND gate 103 and to a rotor power supply circuit 12'. The rotor power supply circuit 12' begins operation in response to the first stroke on the release button 101. With power supplied to the rotor 12, the rotor 12 turns counterclockwise against the urging force of the spring 18. The rotor 12 is then charged and set in a start position. Then, the start position confirmation signal contact pieces 19' and 20' are turned on by the rotor 12. Then, the power supplied by the rotor power supply circuit 12' is stopped by an output from the start position confirmation circuit 102. Reference numeral 104 identifies a release mechanism which is provided with a known release action holding mechanism, etc. The release mechanism 104 begins to operate when a high level signal is supplied thereto from an AND gate 103. The light projecting element control circuit 105 produces pulses. Then, in synchronization with the pulse output of the circuit 105, the light projecting elements I1–I9 of the light projecting part 26 emit light, one after another. The light thus emitted is received by the light sensitive elements S1–S9. This light projecting operation is repeatedly performed as the rotor 12 turns clockwise. However, since one cycle of the light emitting operation of the light projecting elements I1–I9 is performed at an extremely high speed as compared with the clockwise turning movement of the rotor 12, the position of the rotor 12 remains almost unchanged while the light projecting elements I1–I9 make one cycle of the light emitting operation. At each of the light sensitive elements S1–S9, the quantity of received light is converted into a current value and is supplied to a peak detection part 32. The peak detection part 32 consists of nine peak detectors K1–K9. The current values which are produced from the light sensitive elements S1–S9, corresponding to the light projecting elements I1–I9, are supplied to the corresponding peak detector K1–K9, one after another, in synchronization with signals produced from the light projecting elements control circuit 105 to the light projecting elements I1–I9. Each of the peak detectors K1–K9 detects the peak value of the received light quantity repeatedly received by one of the corresponding light sensitive elements S1–S9 as a result of repeated light emission by one of the corresponding light projecting elements I1–I9. These peak detectors K1–K9 produce high level signals until the peak values are detected and then produce low level signals upon detection of the peak values. A pulse generator 106 produces pulses as signals designating distance adress Nos. 1–15 (which will be described in detail later) as the tip parts 12c bring the count contact piece 13 into contact with the count contact piece 14 while the rotor 12 turns clockwise. An AND gate part 107 consists of nine AND gates A1–A9. The AND gates A1–A9 respectively have their gates open until the of output levels of corresponding peak detectors K1–K9 become low level. The pulse counter part 108 consists of nine pulse counters M1–M9. These pulse counters M1–M9 respectively count the number of pulses produced from the pulse generator 106 via the AND gate part 107 until the peak detectors K1–K9 detect the peak values (until their output levels change from high to low levels). In addition, the pulse counters M1–M9 store the values thus counted.

A distance measurement completion detecting part 109 detects completion of distance measuring when the distance measurement completion signal contact pieces 19 and 20 turn on upon scanning completion performed by the turning movement of the rotor 12. Upon the detection of distance measurement completion, the detecting part 109 produces a distance measurement completion signal. The nearest distance determining circuit 110 operates upon receipt of the distance measurement completion signal from the detecting part 109. The nearest distance determining circuit 110 determines the smallest of distance address Nos. 1–15 stored at the pulse counters M1–M9 and produces the smallest of them thus determined. A light sensitive element 111 for exposure light concurrently begins preliminary light measurement with the start of the release mechanism 104 operation and converts the light quantity from a photography object into an electrical signal. The aperture value determining circuit 112 receives the electrical signal from the light sensitive element 111 for exposure light and converts it into an aperture value F. The aperture value F thus obtained is supplied to an A/D conversion circuit 113. The A/D conversion circuit 113 then converts the aperture value F into a digital signal, an aperture information value which will be described in detail later. The distance address Nos. 1–15 produced from the nearest distance determining circuit 110 and the digitized aperture information value from the A/D conversion circuit 113 are added up by and produced from the lens position computing circuit 114. A pulse generator 115 produces a number of pulses corresponding to the lens shift when the lens shifting extent signal contact piece 7 slides over the pulse plate 8 as the distance adjustment ring 5 turns. This number of pulses is produced as a lens shifting extent monitor signal.

The lens draw-out control circuit 116 operates in response to the second stroke on the release button 101. The lens circuit draw-out control circuit 116 compares the pulse signal from the pulse generator 115 with the signal produced from the lens position computing circuit 114 and, at the same time, begins supplying power to the magnet 11 for starting distance adjustment. When the number of the pulse signal produced from the pulse generator 115 coincides with the signal from the lens position computing circuit 114, the power to the distance adjustment starting magnet 11 is cut off by the control circuit 116. An inverter 117 produces a low level signal upon receipt of a high level signal from the release button 101 and a high level signal upon receipt of a low level signal therefrom. A memory cancel circuit 118 operates in response to a high level signal from the invertor 117 and, after the lapse of a given delay time, produces a high level signal to the reset terminals of the pulse counters M1–M9, thereby resetting these pulse counters M1–M9. A comparator 119 compares a lens position designating signal produced from the lens position computing circuit 114 with the number of signal pulses produced from the pulse generator 115. A display circuit 120 displays an in-focus condition based on a signal produced from the comparator 119 when the in-focus condition is attained.

A depth range computing circuit 121 adds the signal from the lens position computing circuit 114 and the aperture value information from the A/D conversion circuit 113 together and produces the addition result at a digital comparator part 122. The digital comparator part 122 consists of nine digital comparators C1–C9. Each of the digital comparators C1–C9 compares the number of pulses stored at one of the pulse counters M1–M9 with a computed value produced from the depth range computing circuit 121 and produces a high level signal to an AND gate part 123 only when the value stored at the pulse counter is smaller than the computed value. The AND gate part 123 consists of nine AND gates G1-G9 and allows the signal outputs of the digital comparators C1-C9 to be supplied to a display circuit part 124 when a distance measurement completion signal is received from the distance measurement completion detecting part 109. The display circuit part 124 consists of nine display circuits H1-H9. Upon receipt of a high level signal from the AND gate part 123, the display circuit part 124 causes the applicable display elements E1-E9 of a display element part 125 to light up. This enables the photographer to know at which of the distance measuring points P1-P9 the photography object is located within the field depth range.

The embodiment operates as follows: When the photographer determines a picture composition as shown in FIG.7, for example, and pushes the release button 101 a first stroke, a power source switch turns on. A high level signal is supplied to each of the rotor power supply circuit 12', the start position confirmation circuit 102, the AND gate 103 and the inverter 117. Power is supplied by the rotor power supply circuit 12' to the rotor 12. This causes the rotor 12 to begin to turn counterclockwise against the urging force of the spring 18 and stops in a shown in FIG. 3. The start position confirmation circuit 102 confirms that the rotor 12 comes to the position shown in FIG. 3 and thus has reached a position permitting the start of the distance measurement. The circuit 102 then produces a high level signal to the AND gate 103 and the rotor power supply circuit 12'. With the high level signals supplied from the release button 101 and the start position confirmation circuit 102, the AND gate 103 produces a high level signal, thereby operating the release mechanism 104. Meanwhile, the high level signal supplied to the inverter 117 is changed to a low level signal. The low level signal thus obtained is supplied to the memory cancel circuit 118 and changes the high level signals which have been produced at the reset terminals of the pulse counters M1-M9 to low levels. Then the pulse counters M1-M9 are ready for their counting operations.

Meanwhile, when the high level signal is supplied from the start position confirmation circuit 102 to the rotor power supply circuit 12', the power supply to the rotor 12 is cut off. The rotor 12 then turns based on the urging force of the spring 18. This causes the light projecting part 25 to begin scanning from the closest distance to infinity. Concurrently, operation of the release mechanism 104 causes respectively the light sensitive element 111 for exposure light and the light projecting element control circuit 105 to begin to operate. The light projecting element control circuit 105 causes the light projecting elements I1-I9 to begin their synchronized flickering operations and the light sensitive elements S1-S9 to begin their synchronized light receiving operations. The distance measuring points P1-P9 are scanned by these operations. The speed at which the distance measuring points P1-P9 are scanned, i.e. the flickering shifting speed of the light projecting elements I1-I9, is much higher than the scanning speed which takes place in the distance direction as the angle of the light projecting part 25 varies. For the sake of a simplified description, the nine light projecting elements I1-I9 are in combination with the nine light sensitive elements S1-S9 in this embodiment, as shown in FIG. 6. The points within the visual field 41 of the view finder to be detected by the light sensitive elements S1-S9 are also the nine distance measuring points P1-P9, as shown in FIG. 7(a). However, in accordance with the invention, this number may be either decreased or increased to an N number of distance measuring points P1-Pn, for example, as shown in FIG. 7(b). Furthermore, their arrangement does not have to be the illustrated configuration but may be, for example, a concentric circular arrangement. Furthermore, in order to prevent or minimize possible mutual interference on the surface of the photography object, the sequence of light emission from the light projecting elements I1-I9 is preferably not in the consecutive order of I1-I9, but avoids consecutive light emmission from adjacent elements. In this particular embodiment, however, synchronized light emission or flickering is performed in order, beginning with the element I1 and ending with the element I9 in such a way as to repeat this light emitting order.

Figure 9:
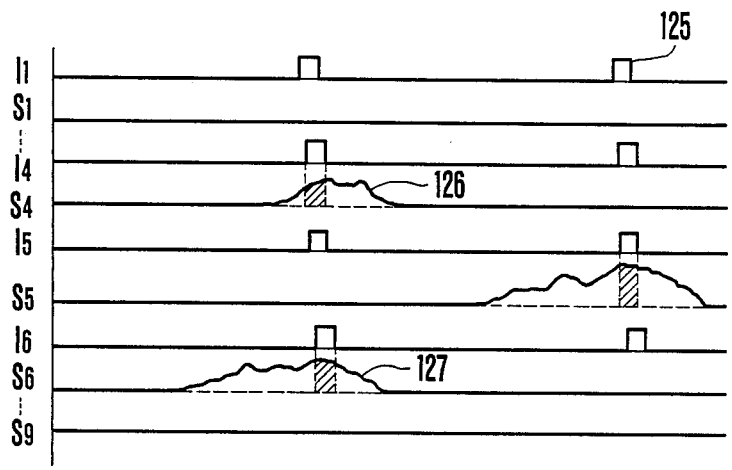
FIG. 9 is a chart showing the operations in the light projecting elements and light sensitive elements of the same embodiment.
Figure 10:
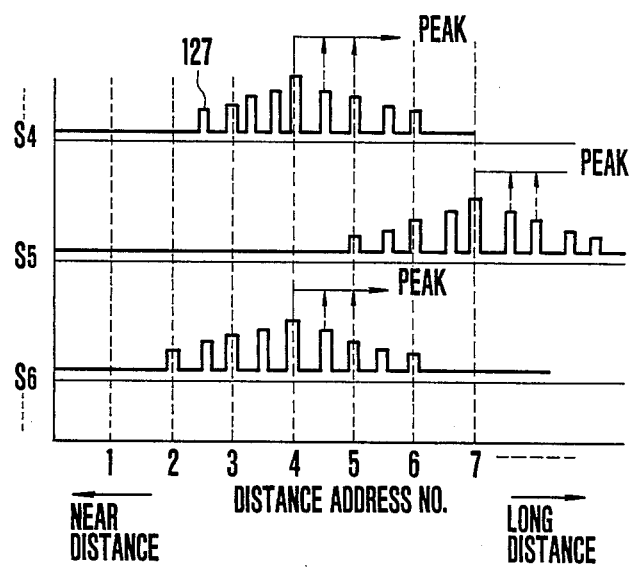
FIG. 10 is a chart showing the light receiving signals in the same embodiment.

In the process by the scanning rotor 12, the light projecting elements I1-I9 project light emission signals 125 onto the distance measuring points P1-P9, one after another, as shown in FIG. 9. The light sensitive elements S1-S9 convert the light quantities received into current values 126 and supply the current values to the peak detectors K1-K9. Each of the peak detectors K1-K9 receives the current value produced from the corresponding light sensitive elements S1-S9 during light emission by one of the light projecting elements I1-I9 paired therewith, the current value being received as a received light signal 127, which is indicated by hatching in FIG. 9. Then, each of the peak detectors K1-K9 produces a high level signal to the AND gate part 107 until a peak value is detected, as shown in FIG. 10. Upon detection of a peak value, the output of the peak detector K1-K9 changes to a low level signal. Meanwhile, the pulse generator 106 produces pulses indicative of distance address Nos. 1-15 as the rotor 12 scans. More specifically, the first of these pulses indicates a distance address No. 1, the second of the pulses a distance address No. 2 and the firfteenth pulse a distance address No. 15. Referring to FIG. 10, the distance address Nos. 1-15 are respectively allocated to a predetermined distance from 0.8 m to infinity ∞. While the corresponding peak detectors K1-K9 is producing a high level output, each of the AND gates A1-A9 allows the pulses from the pulse generator 106 to be supplied to the applicable pulse counter M1-M9. This allows the pulse counters M1-M9 to count the pulses until the received light signals 127 reach peak values and store the count values thus obtained there. The count values thus obtained coincide with the distance address Nos. 1-15 which indicate object distances at the distance measuring points P1-P9. In FIG. 11, for example, the count value of the pulse counters M1-M3 is 10. The count value of the pulse counter M4, which corresponds to the distance measuring point P4, is 4. The count value of the pulse counter M9, which corresponds to the distance measuring point P9, is 9.

Upon scanning completion by the rotor 12 (upon completion of a distance measuring operation), the rotor 12 pushes the distance measurement completion signal contact pieces 19 and 20, turning them on. As a result, the distance measurement completion detecting part 109 detects completion of the distance measuring operation and thus produces a distance measurement completion signal to the nearest distance determining circuit 110 and the AND gate part 123. Upon receipt of the distance measurement completion signal, the nearest distance determining circuit 110 determines the smallest of the count values stored at the pulse counters M1–M9. For example, in FIG. 11, the circuit 110 selects the count value 4 from the pulse counters M4 and M6 and supplies it to the lens position computing circuit 114.

The light sensitive element 111 for exposure light, on the other hand, begins to measure light in response to a signal from the release mechanism. The element 111 then converts the brightness of the object into an electric current value. The current value thus obtained is supplied to the aperture value determining circuit 112. The aperture value determining circuit 112 then converts the current value, for example, into an aperture value such as F2.8 or F4 and supplies the aperture value to the A/D conversion circuit 113. The A/D conversion circuit 113 converts the aperture value into a digital value. For example, the aperture value is converted into aperture information value 1 if the aperture value is F2.8; into aperture information value 2 if the aperture value is F4; - - - ; and into aperture value information 8 if the aperture value is F32. The digital signal of the aperture information thus obtained is supplied to the lens position computing circuit 114 and the depth range computing circuit 121. Furthermore, assuming that the embodiment permits focusing for all the distance measuring points P1–P9 of the view finder visual field 41, the aperture value to be determined by preliminary light measurement is preferably a value for the smallest aperture possible. Therefore, it is preferable that the shutter to be used for the camera in accordance with this embodiment of the invention is a shutter that can be set at a shutter time for smallest aperture possible within a range free from possible photo blur.

The lens position computing circuit 114 adds the distance address Nos. 1–15 obtained from the nearest distance determining circuit 110 to the aperture information value from the A/D conversion circuit 113 to obtain a computed value. This computed value is supplied respectively as a lens position designating signal to the lens draw-out control circuit 116, comparator 119 and depth range computing circuit 121. For example, when the distance address number of the nearest distance is 4 as shown in FIG. 11, the lens position computing circuit 114 computes as 4+1=5 if the aperture information value is 1 (F2.8); as 4+3=7 if the aperture information value is 3 (F5.6); and as 4+7=11 if the aperture information value is 7 (F22). The computed value thus obtained designates a lens position at which the lens can be focused on the distance corresponding to the computed value. For example, the computed value 5 designates a lens position at which the lens is in focus for a distance 1.6 m, which corresponds to the distance address No. 5.

Figure 12A:
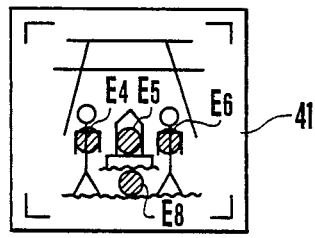
FIGS. 12(a) and 12(b) are illustrations showing in-focus distance measuring points within the field depth in the same embodiment.
Figure 12B:
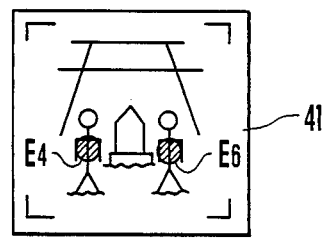
Figure 13:
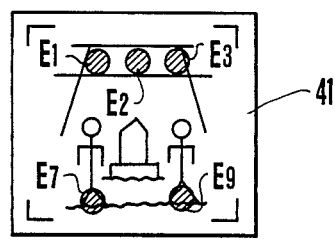
FIG. 13 is an illustration showing defocused distance measuring points outside the field depth in the same embodiment.

The depth range computing circuit 121 adds the computed value produced from the lens position computing circuit 114 to the aperture information value produced from the A/D conversion circuit 113 and supplies the result to the digital comparator part 122. Referring to FIG. 11, if the computed value from the lens position computing circuit 114 is 6 and the aperture information value from the A/D conversion circuit 113 is 2 (F4), for example, the depth range computing circuit 121 computes as 6+2=8. This computation result is supplied to the digital comparators C1–C9. The digital comparators C1–C9 then compare the computed value 8 from the depth range computing circuit 121 with the count values stored at the pulse counters M1–M9. After the comparison, the digital comparators C4, C5, C6 and C8, having count values below 8 stored there, are allowed to produce high level signals to the AND gate part 123. Upon receipt of the distance measurement completion signal from the distance measurement completion detecting part 109, the AND gates G4, G5, G6 and G8 respectively supply the high level signals received from the digital comparators C4, C5, C6 and C8 to the display circuits H4, H5, H6 and H8 of the display circuit part 124. Upon receipt of these high level signals, the display circuits H4, H5, H6 and H8 cause the display elements E4, E5, E6 and E8 to light up, as shown in FIG. 12(a). In this specific embodiment, all the diplay elements E4, E5, E6 and E8 corresponding to the distance measuring points P1–P9 that come within the field depth light up. However, it is also possible arrange only the display elements E4 and E6 corresponding to the distance measuring points P1–P9 that are measured as the nearest objects by the camera to light up, as shown in FIG. 12(b). In that event, coincidence detectors may be used in place of the digital comparators C1–C9 and may select some of the outputs of the pulse counters M1–M9 that coincide with the output of the nearest distance determining circuit 110. Furthermore, it is also possible to cause the distance measuring points P1, P2, P3, P7 and P9 (or the diplay elements E1, E2, E3, E7 and E9) to be displayed for the purpose of, for example, warning that they are not included within the field depth. Such modifications can be made without difficulty.

These processes of operation are accomplished within a very short time period, while the photographer is pushing the shutter release button 101 the first stroke thereof. In the event that the photographer finds that the object condition as determined and displayed by the camera as shown in FIG. 12(a), does not agree with what is intended by the photographer, the distance measuring operation performed up to that time can be cancelled by just releasing the release button 101 to bring it back to its original position thereof.

If the object condition as determined by the camera agrees with what is intended by the photographer, the photographer depresses the shutter release button 101 a second stroke. With the release button 101 thus depressed a second stroke, a high level signal is supplied to the lens draw-out control circuit 116. This signal operates the lens draw-out control circuit 116 and to supplies power to the distance adjustment starting magnet 11 when a signal is supplied to the circuit 116 from the lens position computing circuit 114. The magnet 11 is excited turning the stop pawl 9 counterclockwise against the urging force of a spring (not shown). Then, the claw part 9b of the stop pawl 9 is disengaged from the charged lock part 5c of the distance adjustment ring 5. As a result, the distance adjustment ring 5 begins to turn counterclockwise based on the urging force of the spring 6. The lens shifting extent monitor signal contact piece 7 then slides over the pulse plate 8. The sliding extent of the contact piece 7 (or lens shifting extent information) is supplied in the form of a number of pulses from the pulse generator 115 to the lens draw-out control circuit 116. Concurrently, the lens shifting extent information is also supplied in the form of a number of pulses from the pulse generator 115 to the comparator 119. The comparator 119 compares the number of pulses with the computed value produced from the lens position computing circuit 114. At the lens draw-out control circuit 116, the value of the information from the lens position computing circuit 114 and from the pulse generator 115 are compared with each other. When these information values coincide with each other, power to the distance adjustment starting magnet 11 is cut off. In other words, when the number of pulses produced from the pulse generator 115 reaches a value which is the same as that from lens position computing circuit 114 (for example, when six pulses have been counted where the information value is 4+6=6), the distance adjustment starting magnet 11 loses its power. As a result, the stop pawl 9 turns clockwise based on the urging force of the spring (not shown). Then, the claw part 9b of the stop pawl 9 plunges, for example, into the lock part 5e of the distance adjustment ring 5 ending the draw-in action of the lens barrel 1. The photo-taking lens then stops in a condition in which the closest object is located between an accurately focused distance and the near point of the field depth. Meanwhile, the display circuit 120 displays an in-focus condition in response to a signal then produced from the comparator 119.

Figure 1:
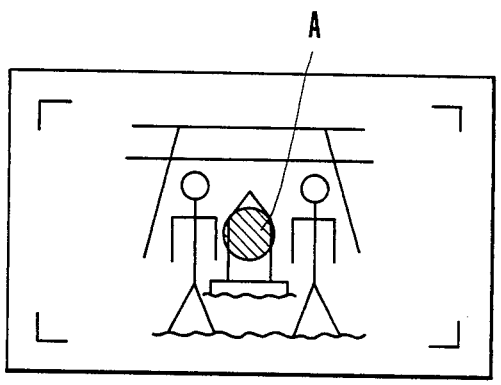
FIG. 1 is an illustration of the visual field of the view finder of a conventional camera.

At the same time, a known exposure operation is initiated. Then, upon completion of a series of phototaking actions, a film is wound either manually or by means of a winding motor to advance the film one frame. Each of the members required for photo-taking is then charged and the camera returns to the condition of FIG. 1.

Referring now to FIGS. 11 and 14, the method for determining the lens barrel shifting position of this embodiment is compared with a example of the method conventionally employed for that purpose as follows: In this embodiment, the A/D conversion circuit 113 produces the aperture information value with the maximum aperture value F2.8 as aperture information value 1 and with this information value 1 increased to 2, 3, and so on as the aperture is stopped down stepwise. Furthermore, among the count values stored at the pulse counters M1-M9, the smallest value is discriminated and produced by the nearest distance determining circuit 110. The output of the circuit 110 is then subjected to adding computation at the lens position computing circuit 114 and is produced as a lens position designating signal. Assuming that the field depth of the photo-taking lens is "t", the allowable diameter of scattering circle is $\delta$, the aperture value is F and the object distance is "u", there is obtained a relation $t = 2\delta u^2 f^2 F(f^4 - u^2 \delta^2 F^2)$. Therefore, by utilizing the fact that the field depth increases as the aperture value F is stopped down, the increasing portion of the field depth is arranged to be used for distances farthr than the closest object distance (a main object). This is the concept of the embodiment.

In the conventional method, as shown in FIG. 14(a), when a signal representing a distance to the object is produced, shifting of the photo-taking lens stops based on the object distance thus obtained. In other words, if an in-focus signal is produced when the object distance is 1.35 m, the photo-taking lens is stopped from being shifted at a position corresponding to 1.35 m. In the embodiment shown in FIG. 14(b), when the distance address No. 4 is produced from the nearest distance determining circuit 110, for example, the aperture information value which is 1 (in the case of aperture value F2.8) is added to the distances address No. 4 to obtain 5. Thus, in that situation, the shifting position of the lens barrel is designated as the position of the distance address No. 5 (1.6 m). More specifically, in a photography picture composition where the nearest object is located at a distance of 1.35 m with the lens aperture set at F5.6, the object distance range, which appears to be in focus on the film surface, is from 0.6 m to 4.8 m in accordance with the conventional method. Therefore, in the conventional method, in-focus background objects are limited to 4.8 m and objects located farther become blurred. In accordance with this embodiment, however, the in-focus object distance range is from 0.78 m to 17 m. In addition to this broader in-focus range, the blurring of an object located at infinity can be reduced to a great degree by the method of this embodiment to than the blurring resulting from the conventional method, as shown in FIG. 14.

Figure 15:
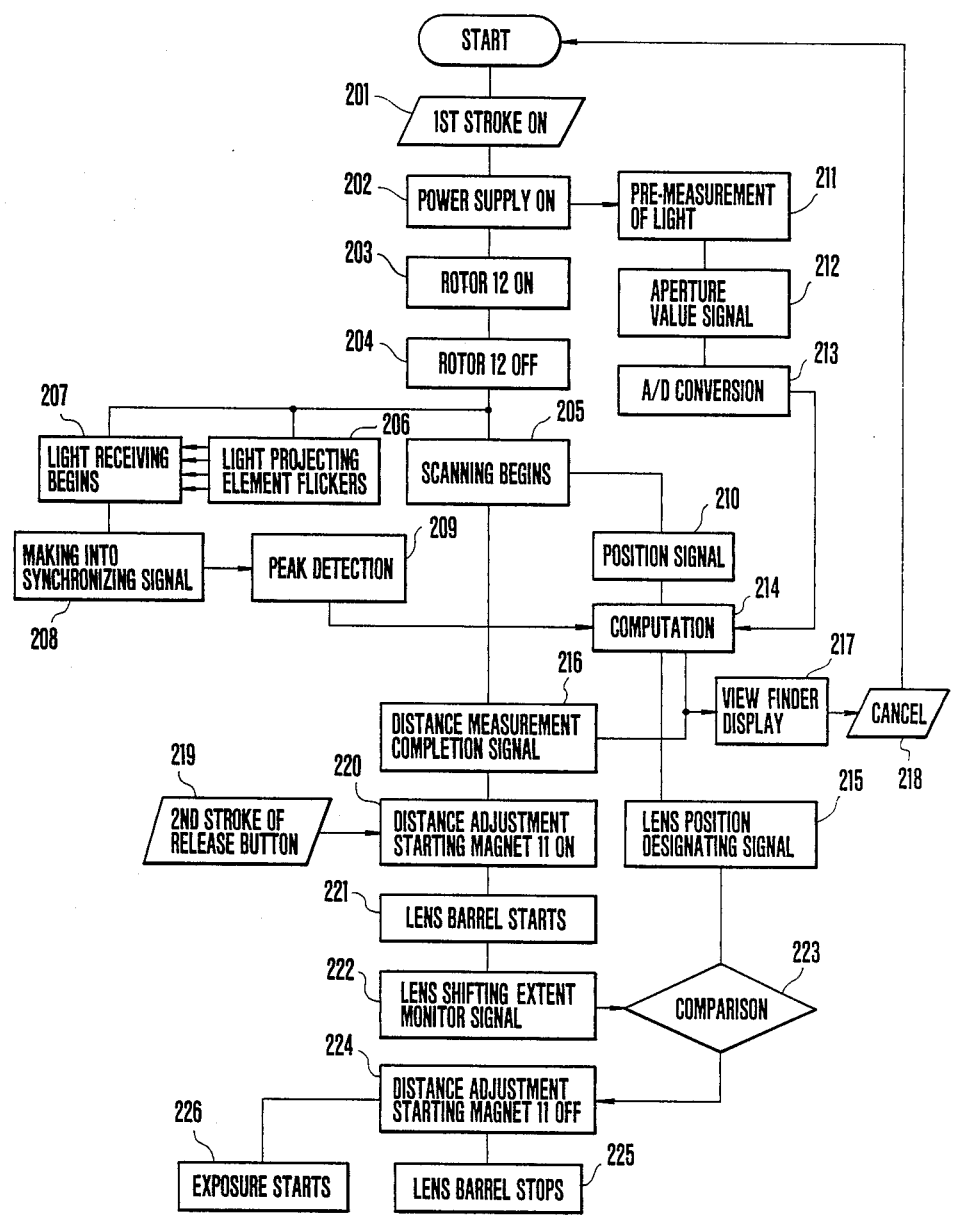
FIG. 15 is a flow chart showing the operation of the same camera.

The processes of operation described in the foregoing are summarized by the flow chart of FIG. 15. The photographer first determines the picture composition for the object to be photographed. The shutter release button 101 is depressed (step 201). Power is supplied to each circuit readying the camera for photography (step 202). Power is supplied to the rotor 12 (step 203). When the rotor 12 turns and reaches the condition shown in FIG. 2, power to the rotor 12 is cut off (step 204). With the power cut off, the rotor 12 begins scanning (step 205). At the same time, an instruction for synchronized flickering of the light projecting element part 26 is produced, causing the light projecting elements I1-I9 to begin synchronized flickering (step 206). The light sensitive elements S1-S9 of the light sensitive element part 31 receive light (step 207). In the current values produced from the light sensitive elements S1-S9, portions synchronizing with light emission from the light projecting elements I1-I9 are alone turned into synchronized signals as received light signals (step 208). The peak value of the received light signals, which are analog values, is detected (step 209). At the same time, with the rotor 12 scanning, a position signal relative to the rotor 12 is being produced in the form of a number of pulses (step 210). Then, the distance scanned at the point of time when the peak value is obtained is determined.

Meanwhile, with an exposure control mechanism (not shown) coming into operation, preliminary light measurement begins (step 211). The exposure light sensitive element 111 receives light to determine an aperture value (step 212). This aperture value is A/D converted (step 213). To the aperture value is added the number of pulses produced, until the peak value is detected in a manner shown in FIG. 11 (step 214). As a result, a lens position designating signal is obtained (step 215). The lens position designating signal is stored at the lens draw-out control circuit 116.

Upon object distance measuring completion performed by the turning movement of the rotor 12, the distance measurement completion signal contact pieces 19 and 20 turn on producing a distance measurement completion signal (step 216). With the distance measurement completion signal produced, a distance measuring point determined by the camera is displayed as an object distance (step 217). If this display differs from the picture of the object intended by the photographer, the release button 101 is allowed to return to its original position, cancelling the foregoing operation (step 218). Then, the operation begins again.

If the condition of the object intended by the photographer agrees with the distance measuring point determined as an object distance by the camera, the photographer strokes the release button 101 a second time (step 219). The second stroke on the release button 101 turns on the distance adjustment starting magnet 11 (step 220). The lens barrel 1 begins to shift its position (shift 221). A lens shifting extent monitor signal is produced the lens barrel shift proceeds (step 222). The lens draw-out control circuit 116 has the lens position designating signal stored there. The control circuit 116 compares this stored signal with the lens shifting extent monitor signal (step 223). When the two signals coincide with each other, the distance adjustment starting magnet 11 is turned off (step 224). The magnet 11 is demagnetized. This causes the stop pawl 9 to stop the distance adjustment ring 5 from turning and the lens barrel 1 from shifting (step 225). At the same time, with the magnet 11 turned off, an exposure operation begins in a known manner (step 226). A series of photo-taking actions then ends.

The operation of the embodiment in a flash light photography mode is as follows: With the camera directed at a dark object for flash photography, when the photographer pushes the release button 101, preliminary light measurement for the object begins in response to the first stroke of the release button 101 in the same manner as in an ordinary photography mode. However, since the object is dark, the aperture value determining circuit 112 determines an aperture value which exceeds the maximum aperture (aperture value F2.8). Meanwhile, the digital signal coming from the A/D conversion circuit 113 to the lens position computing circuit 114 is the aperture information value 1 when the aperture value is F2.8. In this case, therefore, the aperture information value is 0. Furthermore, in this specific embodiment, the level of the A/D conversion circuit 113 is set by known means in such a manner that the digital signal is produced as the above aperture information value 0 when the object brightness is less than EV9.

With the aperture information value 0 supplied to the lens position computing circuit 114, the lens position computing circuit 114 designates the position of the photo-taking lens in the same manner as with conventional cameras, which coincides the measured object distance with the focusing distance of the lens. In other words, the circuit 114 computes as 4+0=4 when the distance address Nos. 1-15 coming from the nearest distance determining circuit 110 is 4 in such a manner that it produces a lens position designating signal which is equal to the distance address number. After that, the exposure control mechanism (not shown) adjusts the aperture to an aperture value suited to the object distance selected for use with an automatic flash mechanism. An exposure operation is then performed by the automatic flash mechanism to complete a flash photography operation.

In this embodiment, the arrangement to measure the distance measuring points P1-P9 enables the photographer to focus not only on the main object but also to consider auxiliary objects through one distance measuring operation. Furthermore, the distances measurement marks or the like which have heretofore been provided within the visual fields of the conventional camera view finders are eliminated in the embodiment to simplify the view finder field. This shortens the time required by the photographer before making a decision, enabling him to more readily seize a shutter chance.

Furthermore, the distance measurement with a plurality of light projecting elements I1-I9 in combination with a plurality of light sensitive elements S1-S9 not only enhances resolution but also permits distance measurement for a smaller object as compared with the arrangement for distance measurement with a large projected image of a single element for the same distance measuring range. The embodiment thus permits more accurate photography. Besides, in flash photography, over-exposure of the main object can be prevented since the embodiment permits photography with the lens focused on the main object.

In this specific embodiment, the rotor 12, light projecting elements I1-I9, light sensitive elements S1-S9, pulse counters M1-M9, etc. correspond to the distance measuring means of the present invention. Each of the point-by-point distance measuring units consists of, for example, the light projecting element I1, the light sensitive element S1, the peak detector K1, the AND gate A1 and the pulse counter M1. The nearest distance determining circuit 110 and lens position computing circuit 114 jointly form the lens position designating means of the invention. The depth range computing circuit 121 and the digital comparators C1-C9 jointly form the point-by-point in-focus determining means for each of the distance measuring points.

In the foregoing description of the embodiment, an active type automatic distance detecting method has been described. However, the invention is also applicable also to a passive type distance detecting method. For example, with the Visitronic (trademark) method, a movable mirror is moved to scan the distance measuring points P1-P9 at a higher speed than the scanning operation in the direction of distance and concurrently with the latter scanning operation. Then, in association with the movable mirror, a fixed mirror is also moved to scan the distance measuring points P1-P9. Such a scanning arrangement also permits distance measurement for the distance measuring points P1-P9. In the embodiment described, each of the light projecting element parts I1-I9 and light sensitive element parts S1-S9 consists of nine elements. This arrangement may be replaced with another arrangement wherein the light projecting element part 26 consists of a single light projecting element I1-I9 and the light sensitive element part a single light sensitive element S1-S9; and these single elements are continuously operated, performing distance measurement for the distance measuring points P1-P9 of the view finder field. Furthermore, in the embodiment described, information of the central part of the view finder field and information of the peripheral part of the view finder field are equally weighted in processing them. However, it is possible to process them with different weights in a manner similar to the known center-weighted metering method employed for light measurement.

The present invention is also applicable to situations where the light projecting element I1-I9 is made stationary by using a light sensitive element S1-S9 of the type which can discriminate a light sensitive position (for example, a light sensitive element S1-S9 whose light sensitive part has dimensions relatively variable based on a light sensitive position). It is also possible according to the present invention that the light projecting element I1-I9 is made stationary by using various light signals, which change according to each distance measuring point (for example, variation of wave length) for the projection light.

In the embodiment described, power is supplied to the rotor coil 17 only when the rotor 12 is to be driven to the charged position. However, the rotor 12 may be arranged such that, during scanning, the current direction is switched over from one direction to the other to drive the scanning rotor 12 in the direction.

This invention is also applicable to a camera of the type which automatically performs only distance measurement while distance adjustment is carried out manually by watching the focused condition of the lens. In that event, a predetermined range between the focusing distance of the photo-taking lens and the near point of the field depth is displayed as an in-focus region. Furthermore, lens position computation may be carried out in the following manner: An object located at the closest distance is determined; and a position signal is determined in such a way as to stop the lens barrel 1 at a position in which the lens is focused on that object. In another possible method, the field depth is determined based on a predetermined aperture information value; the near point of the field depth is compared with a signal representing the closest object distance; and the photo-taking lens stops at a position in which the nearest object is located farther than the near point of the field depth of field and is closest to the near point. Furthermore, it is also possible to determine the photo-taking lens shifting position by obtaining signals representing the nearest and farthest distances of all objects located within a photographable range and by determining an aperture value which has all of them within the field depth based on these signals.

In accordance with this invention, as described in the foregoing, a plurality of distance measuring points P1-P9 are set within an object range extending perpendicular to the distance direction. While a distance between the closest distance and infinity is unidirectionally and optically scanned, the above plurality of distance measuring points P1-P9 are also scanned at the same time. Therefore, a plurality of object distances can be simultaneously detected, enhancing the efficiency of the distance measuring device. Furthermore, in accordance with the invention, the closest object distance information value is selected from multiple object distance information values obtained by the distance measuring means. Then, a photo-taking lens position suited to the selected object distance information is designated by the lens portion designating means. Therefore, among multiple objects, the lens is focused on the nearest object in preference to other objects. The distance measuring device is therefore advantageous, since the focusing arrangement thereof readily satisfies the photographers. Furthermore, in accordance with the invention, the lens position designating means designates a photo-taking lens position in such a manner that a distance measured object is located between the focusing distance of the photo-taking lens and the near point of the field depth determined by the lens aperture. Therefore, the lens position thus designated not only has the lens focused on the main object but also, to a certain degree, has the lens focused on other objects.

According to the invention, the photo-taking lens position is designated in such a manner that the distance measured object is located between the focusing distance of the photo-taking lens and the near point of the field depth determined by the lens apertures for a normal photography operation, and is located at a distance which coincides with the focusing distance of the photo-taking lens for flash photography. With the lens position designating means arranged in that manner, focusing can be carried out with the auxiliary objects, such as background objects, taken into consideration. Besides, in flash photography, over-exposure of the main object can be prevented.

The distance measuring device according to the invention comprises the above distance measuring means including a plurality of distance measuring units which, by distance measuring points, detect object distances for every distance measuring point set within the photography picture plane; the lens position designating means which designates a lens position on the basis of the multiple object distance information values obtained from the distance measuring units; a plurality of display elements within the view finder in positions respectively corresponding to the distance measuring points; and point-by-point in-focus determining means which determine distance measuring points that are in focus at the lens position designated by the lens position designating means and to control the display operation the display elements depending on the result of determination. Therefore, the in-focus parts of the photography picture plane can be displayed to enhance the operability of the distance measuring device.

What I claim:

1. An optical apparatus having distance measuring means capable of automatically measuring distances to a plurality of objects imaged on an imaging plane, comprising:
   (a) an optical system for forming the images of said objects within said imaging plane;
   (b) selecting means for selecting distance information on the distance to an object located at the nearest distance among distance information value detected by said distance measuring means; and
   (c) focusing position designating means for designating a focusing position of said optical system suited to said distance information on the nearest object on the basis of the output of said selecting means; and
   (d) display means for displaying objects that are in focus among said plurality of objects with said optical system in the focusing position designated by said focusing position designating means.

2. A camera having distance measuring means arranged to automatically measure a distance to an object to be photographed, comprising:
   (a) a plurality of point-by-point distance measuring units arranged to detect object distances for every one of a plurality of distance measuring points set within a photographing picture plane, said distance measuring units being disposed within said distance measuring means;
   (b) lens position designating means arranged to designate a lens position determined on the basis of a plurality of object distance information values obtained from said point-by-point distance measuring units;
   a plurality of display elements arranged within a view finder in positions corresponding to said distance measuring points; and
   point-by-point in-focus state determining means arranged to determine distance measuring points that are in focus among sad plurality of distance measuring points with a photo-taking lens in said lens position designated by said lens portion designating means, said in-focus state determining means being further arranged to control the display operation of said display elements according to the result of said determination.

3. A distance measuring device of a camera capable of measuring distance to an object by projecting the distance measuring signal and receiving the reflected distance measuring signal comprising:
(A) a plural number of distance measuring means for measuring the distance to a plural number of spots of the photographing picture frame, said means including:
  (a) signal projecting means for projecting the distance measuring signals, said means projecting the distance signal along the light projecting path;
  (b) signal receiving means for receiving the reflected signals of said distance measuring signal, said means receiving said reflected signals along the incident light path; and
  (c) scanning means for altering the crossing position of said light projecting path with said incident light path, said means measuring the distance to the object based upon said crossing position when said signal receiving means receives said reflected signal; and
(B) a control means for carrying out the control so that said plural number of distance measuring means operate at different time.

4. A device according to claim 3, wherein said control means includes change over means for successively changing over said plural number of distance measuring means in such a manner that a plural number of cycles for operating all the distance measuring means are repeated before the termination of the operation of said receiving means.

5. A device according to claim 4, wherein said scanning means is constructed so as to change the crossing position of said light projecting path with the incident light path from the short distance side to the long distance side.

6. A distance measuring device of camera capable of measuring distance to an object by projecting the distance measuring signal and receiving the reflected distance measuring signal comprising:
(A) a plural number of distance measuring means for measuring the distance to a plural number of spots of the photographing picture frame, said means including,
  (a) signal projecting means for projecting the distance measuring signals, said means projecting the distance measuring signals along the light projecting path,
  (b) signal receiving means for receiving the reflected signals of said distance measuring signals, and means receiving said reflected signals along the incident light path, and
  (c) scanning means for alternating the crossing position of said light projecting path with said incident light path, said means measuring the distance to the object based upon said crossing position when said signal receiving means receives said reflected signal, and
(B) changeover means for repeating a plural number of cycles for causing out the changeover of a plural number of distance measuring means before the termination of the operation of said scanning means.

7. A device according to claim 6, wherein said scanning means is constructed so as to change the crossing position of said light projecting path with the incident light path for the short distance side to the long distance side.

* * * * *